United States Patent
Asano et al.

(10) Patent No.: US 8,218,189 B2
(45) Date of Patent: *Jul. 10, 2012

(54) IMAGE FORMING APPARATUS AND METHOD FOR ERASING DATA THEREOF

(75) Inventors: Masayasu Asano, Shizuoka-ken (JP); Mitsuhiro Kinoshita, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 143 days.

This patent is subject to a terminal disclaimer.

(21) Appl. No.: 12/768,436

(22) Filed: Apr. 27, 2010

(65) Prior Publication Data

US 2010/0271653 A1   Oct. 28, 2010

Related U.S. Application Data

(63) Continuation of application No. 11/331,759, filed on Jan. 13, 2006, now Pat. No. 7,733,516.

(30) Foreign Application Priority Data

Jan. 13, 2005   (JP) ................................. 2005-006531

(51) Int. Cl.
*G06K 15/00*   (2006.01)
*G06F 3/12*   (2006.01)

(52) U.S. Cl. ..................... 358/1.16; 358/1.17; 358/1.15; 358/1.13

(58) Field of Classification Search .................. None
See application file for complete search history.

(56) References Cited

U.S. PATENT DOCUMENTS

| 5,237,675 A | 8/1993 | Hannon |
| 7,733,516 B2 * | 6/2010 | Asano et al. ................ 358/1.16 |
| 2005/0174675 A1 | 8/2005 | Hattori et al. |

FOREIGN PATENT DOCUMENTS

JP   9-284572   10/1997

* cited by examiner

Primary Examiner — Dov Popovici
(74) Attorney, Agent, or Firm — Patterson & Sheridan, LLP

(57) ABSTRACT

In one embodiment of an image forming apparatus according to the invention, an overwrite-block specifying device specifies equal size blocks so that a storage area in a data storage device is divided into consecutive equal size blocks to be overwritten with overwrite data. The data storage device includes an image data storage area configured to store encrypted image data on a page-by-page basis. An overwrite-data specifying device specifies the value of the overwrite-data whose size is smaller than that of the equal size block. A data erase control device overwrites the equal size blocks with the value of the overwrite-data, on a block-by-block basis.

19 Claims, 9 Drawing Sheets

IMAGE FORMING APPARATUS AND METHOD FOR ERASING DATA THEREOF

RELATED APPLICATION INFORMATION

This application is a continuation of parent application Ser. No. 11/331,759, filed on Jan. 13, 2006. The parent application is based upon and claims the benefits of priority from the prior Japanese Patent Application No. 2005-6531, filed on Jan. 13, 2005; the entire contents of which are incorporated herein by reference.

BACKGROUND OF THE INVENTION

1. Field of the Invention

The subject application relates to an image forming apparatus, and to a method for erasing data stored in a data storage device provided in an image forming apparatus.

2. Description of the Related Art

A state-of-the-art image forming apparatus such as copy machine, Multi-Function Peripheral (hereinafter, referred also to "MFP") combining the functions of printing, copying, faxing, etc., takes advantage of digital technologies. Further, information on a print job, etc., is stored in a hard disk apparatus that contains a hard disk (HD) as a high capacity data storage medium and is incorporated in the image forming apparatus. If the apparatus incorporating an HD is discarded or sold, or returned to the tenant upon expiration of the lease, or temporarily transferred to an external vendor for repair, etc., there is a risk of leakage of confidential information stored in an HD.

Leakage of confidential information is the most critical social issue and in order to address this very critical issue, suppliers of the copy machine or MFP take countermeasure by encrypting information on a print job, etc., before storing the information in an HD. However, even when information is encrypted, the encrypted information is in some cases decrypted using decryption software.

In order to prevent leakage of confidential information stored in an HD when the printer or MFP is discarded, conventionally, the HD is mechanically destroyed or data stored in an HD is eliminated by placing the HD in a strong magnetic field, or all of used areas of an HD are overwritten with useless data. Among the above-mentioned methods, the method for destroying an HD mechanically can be employed when the apparatus is discarded, but is not suitable for other cases, for example, where the apparatus is sold. Further, the method for exposing an HD to a strong magnetic field requires a special equipment and therefore the implementation of the method is difficult in practice. For these reasons, if the copy machine, etc., or MFP incorporating an HD is discarded or sold, or returned to the tenant upon expiration of the lease, or temporarily transferred to an external vendor for repair, etc., a method for overwriting all of used areas of an HD with useless data has been widely employed. However, this method causes a serious problem. That is, the storage capacity of an HD incorporated into the copy machine, etc., or MFP is as large as a few tens of Gigabytes and in order to overwrite all of areas of an HD having a storage capacity of 50 Gigabytes with useless data, it takes as much as about one hour. Further, the storage capacity of an HD tends to increase and the problem will become more and more serious.

Moreover, for example, when MFP captures the image of an original document, stores the image data temporarily in an HD, retrieves the image data from the HD, and prints out the image data; the image data is still stored in the HD even after the image data has been printed out. More specifically; the image data is stored in a predetermined area of the ED and is still stored in the HD until another original document is read and overwritten with the data of another original document. Accordingly, when the HD is removed from MFP, etc., and information contained in the HD is analyzed, the information contained in the HD will be revealed. A method of avoiding this problematic situation is disclosed in Japanese Patent Unexamined Publication No. 9-284572 in which image data that has been printed out eliminating the need for the image data to be stored in an HD is erased in order. However, a process for erasing image data and a process for scanning the image of an original document, writing image data into an HD, and retrieving the image data from the HD cannot be concurrently performed. For this reason, when erasing of the image data is carried out, other processes have to wait until completion of the erasing of the image data, resulting in reduction in efficiency of other processes and decrease in user convenience. Therefore, what is needed is to reduce the time required in a process for erasing image data stored in an HD.

DETAILED DESCRIPTION OF THE INVENTION

Throughout this description, the embodiments and examples shown should be considered as examples, rather than limitations on the apparatus of the present invention.

Embodiments of the invention will be explained below with reference to the accompanying drawings.

Figure 1:
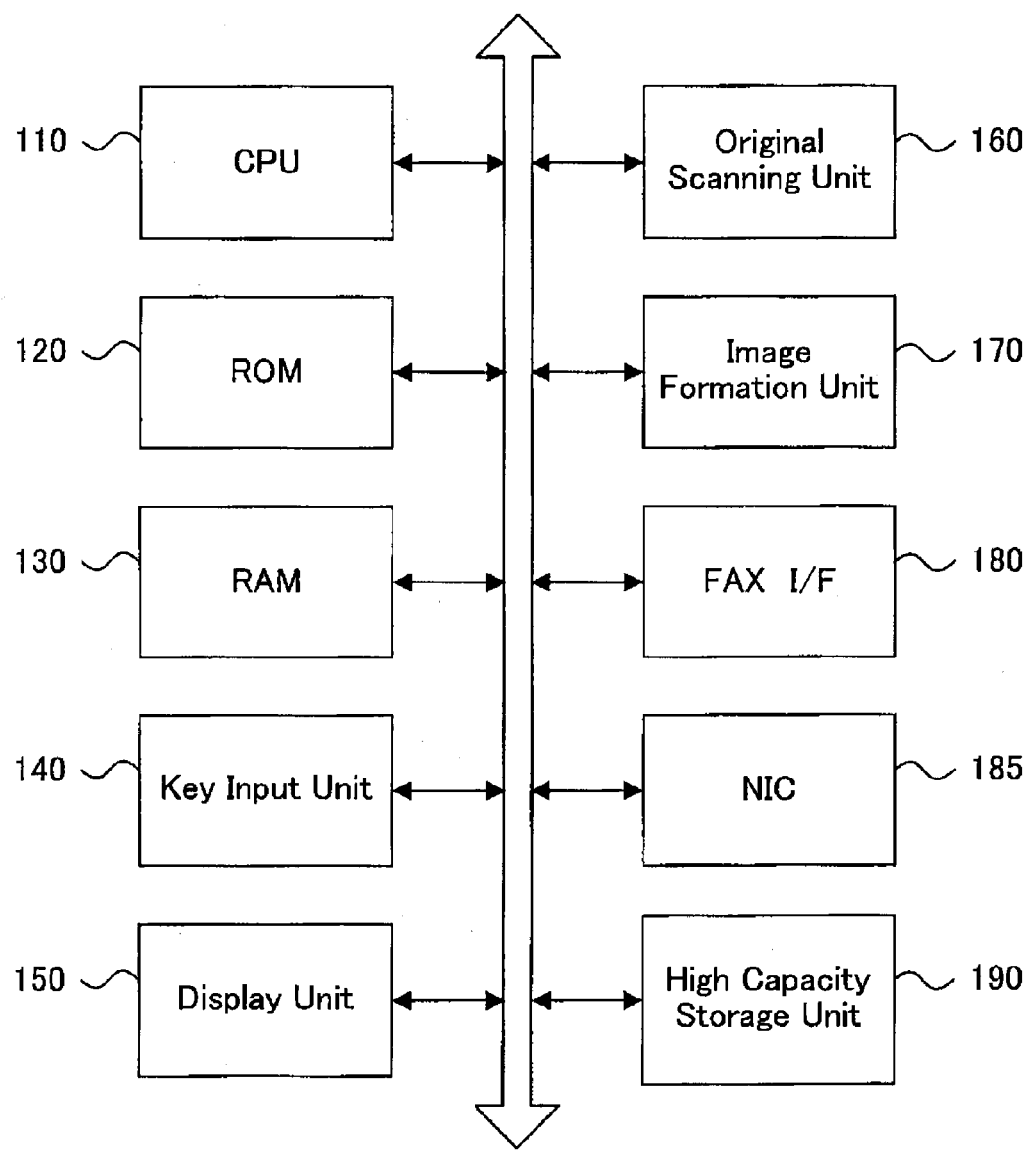
FIG. 1 is an exemplary hardware configuration of an image forming apparatus according to one embodiment of the invention.

FIG. 1 is an exemplary hardware configuration of a Multi-Function Peripheral (MFP) according to one embodiment of the invention. Individual elements in the figure are electrically connected to one another via a bus. In FIG. 1, CPU 110 takes a leading role to control the elements of the MFP, ROM 120 stores a program, etc., for allowing the CPU 110 to control individual elements of MFP, and RAM 130 temporarily stores a program and data copied from the ROM 120, etc. A key input unit 140 is used to allow an operator to input information to control the operation of the MFP during the use of the MFP and a display unit 150 is used to display information necessary for the operation, etc., of the MFP.

Further, an original scanning unit 160 captures the image of an original document and converts the image into electronic data, and an image formation unit 170 forms the image data on a recording sheet. A FAX interface (I/F) 180 performs faxing. In order to allow the image forming apparatus to perform faxing, the FAX I/F 180 comprises a coding/decoding section for coding and decoding image data, a modem, connected to the coding/decoding section, for mutual conversion between coded data and a signal suitable for transmission, and a line control section for controlling to transmit a signal to and to receive a signal from a phone line. A Network interface circuit (NIC) 185 serves as an interface for the MFP to connect to LAN. A high capacity storage unit 190 is capable of storing a large volume of data such as image data.

It should be noted that if the image forming apparatus according to the embodiment, of the invention does not have faxing function, the FAX I/F 190 is unnecessary. Further, if the image forming apparatus according to the embodiment of the invention does not have copying and scanning functions, the original scanning unit 160 is unnecessary. Moreover, if the image forming apparatus according to the embodiment of the invention is a stand-alone machine, the NIC 185 is unnecessary.

Figure 2:
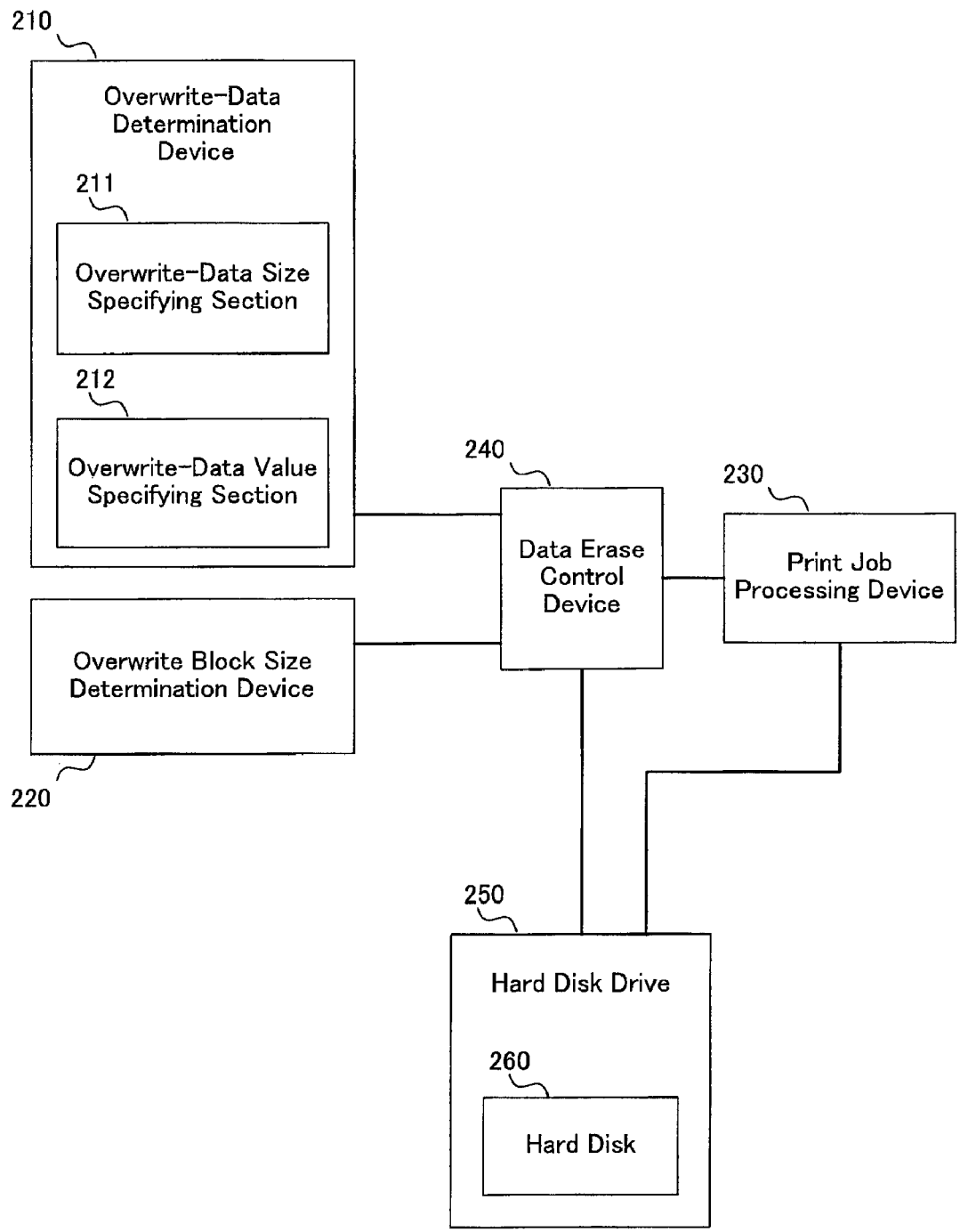
FIG. 2 is a function block diagram showing the image forming apparatus according to one embodiment of the invention and focusing on the function to erase data on a hard disk.

FIG. 2 is a function block diagram showing the image forming apparatus according to one embodiment of the invention and focusing on the function to erase data on a hard disk. Incidentally, the hard disk is a typical storage medium making up the high capacity storage unit 190.

An overwrite-data determination device 210 is capable of specifying data to overwrite a hard disk 260 and includes overwrite-data size specifying section. 211 and an overwrite-data value specifying section 212. Incidentally, the overwrite-data size specifying section 211 specifies the number of bytes of data so that the hard disk 260 is overwritten with the specified number of bytes of data and the overwrite-data value specifying section 212 specifies a data value so that the hard disk 260 is overwritten with the data value.

An overwrite, block-size determination device 220 determines equal-size blocks so that a hard disk memory is divided into consecutive equal-size blocks to be overwritten with the overwrite data specified by the overwrite-data specifying device 210.

A print job processing device 230 processes a job that requests the image forming unit 170 to print; on a recording paper, copy data read by the original scanning unit 160, print data input from PC via the NIC 185, etc., or data-received by the FAX.

A data erase control device 240 is operable to overwrite the hard disk 260 with meaningless data obtained by the overwrite-data determination device 210 and the overwrite block size determination device 220, in order to erase data stored in the hard disk 260. That is, the term "erasing of data" used in the invention means a process for overwriting a disk storage area containing data with meaningless data, in order to prevent malicious users from identifying data stored in the disk.

The functions of the overwrite-data determination device 210, overwrite block size determination device 220, print job processing device 230, and data erase control device 240 are implemented by CPU 110, RAM 130, key input unit 140, display unit 150 and software stored in the ROM 120.

A hard disk drive 250 houses and controls a hard disk 260 that is a high capacity storage device, and comprises an interface for communication with devices external to the hard disk drive 250.

Embodiments of the image forming apparatus according to the invention will be explained below.

Figure 3:
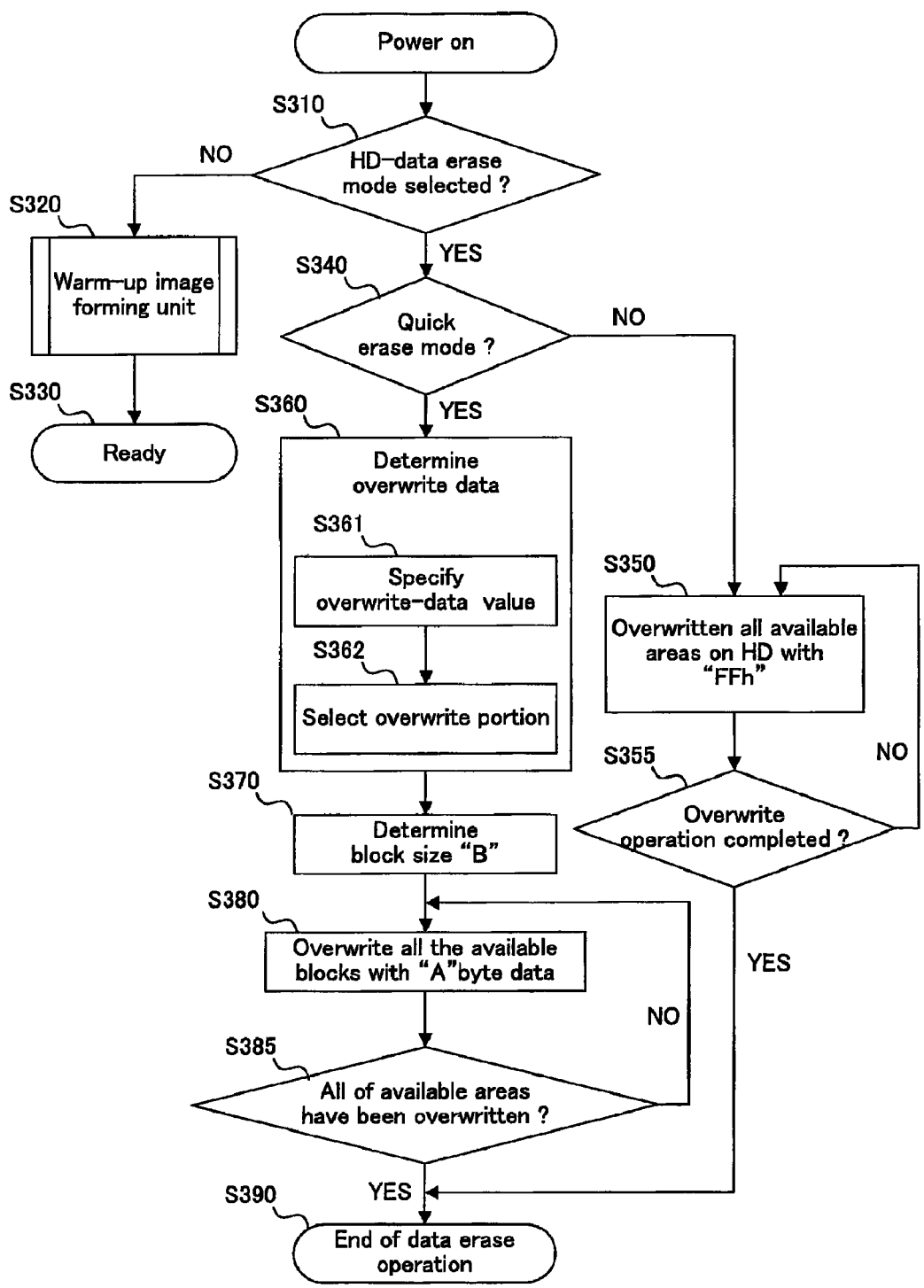
FIG. 3 is a flow chart of a data erase operation in accordance with a first embodiment of the image forming apparatus of the invention.

FIG. 3 is a flow chart of a data erase operation in accordance with a first embodiment of the image forming apparatus of the invention. In this case, assume that the values of data are basically expressed as a hexadecimal number and an alphanumeric string ends with "h" to explicitly indicate that the alphanumeric is a hexadecimal number.

First, it is determined whether or not a hard disk (HD) data erase mode is selected after power on of the MFP that is one of the implementations of the image forming apparatus (S310). If the HD-data erase mode is not selected, the image forming unit 170 is warmed up (S320) and then the image forming unit becomes ready for an image forming operation (S330)

If the HD-data erase mode is selected, it is determined whether or not a quick erase mode is selected (S340). If the quick erase mode is not selected, the available area on the HD is overwritten with the value of, for example, "FFh" in order to erase data stored in the HD (S350). The data overwrite or erase operation is performed on all available areas on the HD (S355). When it is confirmed that all available areas on the HD have been overwritten with data, the data erase operation is terminated (S390) Incidentally, although in this example, "FFh" has been shown as overwrite-data, the overwrite-data may be meaningless data different from data stored in the HDD and therefore is not limited to "FFh".

Figure 4A:
FIG. 4A is the state in an available area on the hard disk after completion of the data erase operation on the hard disk incorporated in the image forming apparatus according to one embodiment of the invention.

FIG. 4A is the state in an available area on the HD after completion of the data erase operation in the event the quick erase mode is not selected. If the quick erase mode is not selected, all of the available areas on the HD are to be overwritten with meaningless data and therefore the amount of time required to erase data on the HD cannot be reduced.

If the quick erase mode is selected, the operation proceeds to S360 where the overwrite-data determination device 210 determines overwrite data so that a part of the available area on the HD is overwritten with the overwrite data and then proceeds to S370 where the overwrite block size determination device 220 determines a size of blocks so that a hard disk memory area is divided into consecutive equal-size blocks to be overwritten with the overwrite data. Assume the size of equal-size block specified as described above is expressed as "B". It should be noted that the order in which the overwrite-data (S360) and the equal-size blocks (S370) are determined may be reversed as compared to that shown in FIG. 3.

In the step S360 of specifying overwrite-data, the value of the overwrite-data is specified (S361) and selection of which portion of the equal-size block, specified in step S370, is to be overwritten is made (S362). It should be noted that the order in which the value of the overwrite-data (S361) is specified and the portion of the equal-size block to be overwritten is specified (S362) may be reversed as compared to that shown in FIG. 3.

It should be noted that when assuming that the size of the overwrite-data specified in step S361 is expressed as "A" and the size of the equal-size block specified in step S370 is expressed as "B", "A" takes smaller value than that of "B". Further, "A" and "B" can be expressed in bytes.

In step S361 of specifying the value of the overwrite data so that the equal-size block is overwritten with the value of the overwrite data, it is contemplated that a certain data value, for example, FFh is commonly used as a default value and then an actual data value is selected from several data values previously registered. Further, the value of the overwrite data could be a randomly selected value. Moreover, the value of the overwrite-data could be a value manually and arbitrarily input by an operator. Examples of the actual value of the overwrite-data specified using either of the above operations are any of the values ranging from 00h to FFh when "A" is 1 byte.

In step S362 of selection of which portion of the equal-size block is to be overwritten, it is contemplated that a certain portion, e.g., the top portion of the equal-size block is selected as a default portion and then an actual portion is selected from several portions previously registered. Further, a selection of which portion of the equal-size block is to be overwritten could be randomly made. Moreover, the portion of the equal-size block to be overwritten could be a portion manually and arbitrarily input by an operator.

Further, in specifying the size "B" of the equal-size block instep S370, it is contemplated that a certain value is selected as the default value of the size and then an actual value is selected from several values previously registered. Further, the size "B" of the equal-size block could be a randomly selected value. Moreover, the size "B" of the equal-size block could be a value manually and arbitrarily input by an operator. Through the use of any one of the above operations, the size "B" of the equal-size block could be specified to be 100h bytes, 500h bytes, or 1000h bytes, for example.

It is also contemplated that instead of specifying the size "B" of the equal-size block, the size of a difference between "B" and "A" could be specified, however, the steps of specifying the size "B" of the equal-size block and specifying the size "B-A" of the difference between "B" and "A" are substantially the same.

After the overwrite-data determination device 210 determines overwrite data so that a part of the available area on the HD is overwritten with the overwrite data and the overwrite-block size determination device 220 determines the size of equal-size blocks so that a hard disk memory area is divided into equal-size blocks to be overwritten with the overwrite data (S370), the data erase control device 240 overwrites the equal-size blocks of the available area on the hard disk 260 with the specified value of data on a block-by-block basis (S380). The data overwrite operation is continued until all of the available areas on the HD have been overwritten with the specified value of data (S385). When it is confirmed that all of the available areas on the HD have been overwritten with the specified value of data, the data erase operation ends up (S390).

Figure 4B:
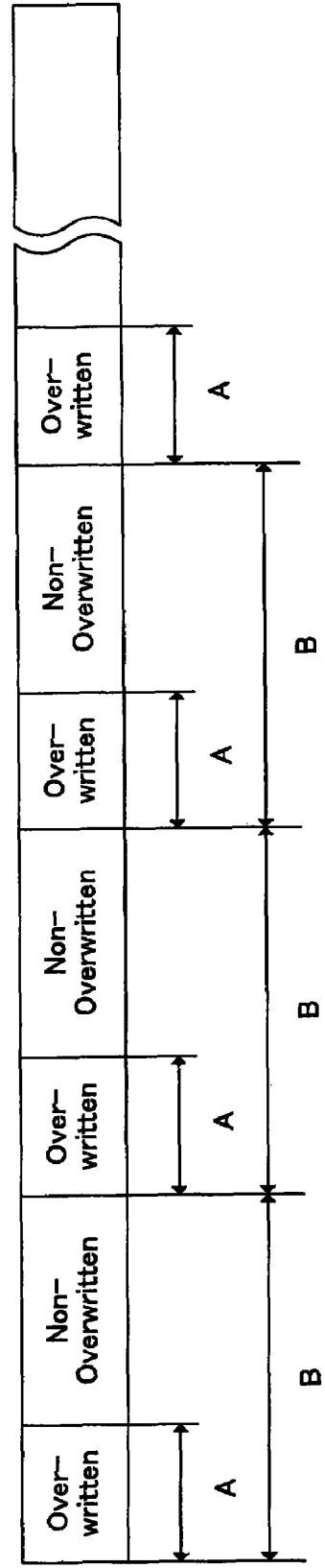
FIG. 4B is the state in an available area on the hard disk after completion of the data erase operation on the hard disk incorporated in the image forming apparatus according to another embodiment of the invention.

FIG. 4B is the state in the available area on the HD after the quick erase mode is selected and the top portion of the equal-size block has been overwritten with the specified value of data.

In more detail, the case where the size "B" of the equal-size block is 100h bytes (256 bytes), the unit size "A", which denotes the size of the overwrite data, is 80h bytes (128 bytes), the overwrite data is a string of 80h bytes: 00h, 01h, 02h, ..., and 7Fh, and the data overwrite operation is performed on the top portion of each equal-size block will be explained. In this case, data to be overwritten has an address including last two hexadecimal number ranging from 00h to 7Fh. The data having the above-described address is overwritten as follows.

That is, the data with an address of 000h is overwritten with the data 00h, the data with an address of 001h is overwritten with the data 01h, ..., the data with an address of 07Fh is overwritten with the data 7Fh, the data with an address of 100h is overwritten with the data 00h, the data with an address of 101h is overwritten with the data 01h, ..., the data with an address of 17Fh is overwritten with the data 7Fh, the data with an address of 200h is overwritten with the data 00h, the data with an address of 201h is overwritten with the data 01h, ..., the data with an address of 27Fh is overwritten with the data 7Fh, etc.

It should be noted that the data having an address that includes last two hexadecimal number ranging from 80h to FFh is not overwritten and therefore remains unchanged.

All the data to be stored in the HD has been encrypted and only changing the data on each page of a file to be stored prevents proper decoding of all subsequent data. Accordingly, the data stored in a portion other than the overwritten portion of the equal-size block shown in FIG. 4B cannot be properly decoded. The fact that the data cannot be properly decoded means that substantially all the data stored in the HD has been substantially completely erased.

According to this embodiment, the use of very simple software allows the data stored in the HD to be erased in a short period of time and therefore makes it possible to greatly reduce the amount of time required to erase data for security reasons, including prevention of leakage of confidential information.

Figure 5:
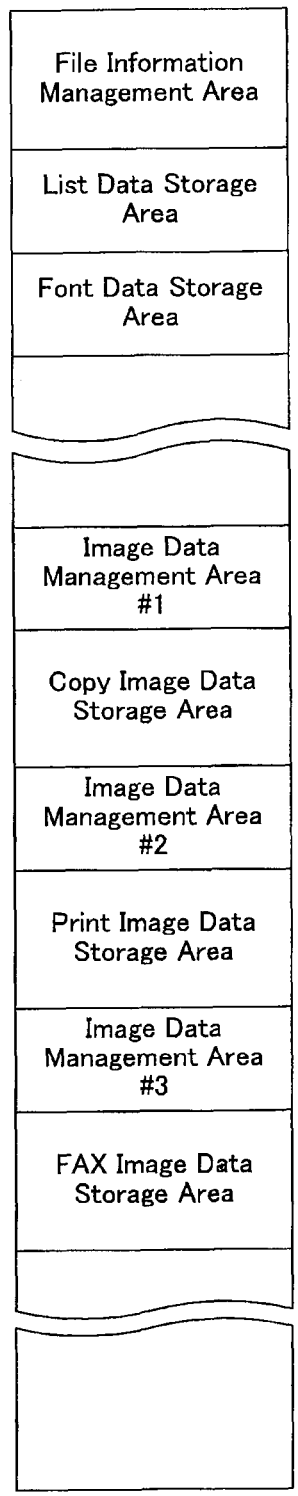
FIG. 5 is a diagram to explain an example of the storage area of the hard disk of the embodiment of the image forming apparatus according to the invention.

Next, an embodiment where the storage area of the HD is taken into account will be explained below. Before giving an explanation of the embodiment, the storage area of the HD is explained. FIG. 5 is a diagram to explain an example of the storage area of the HD. In the example shown in FIG. 5, the HD provided in the image forming apparatus includes an attribute of each file stored therein, a file information management area for storing management information on, for example, which portion of the HD contains each file, a list data storage area for storing initial setting data for the image forming apparatus, and a font data storage area for storing font data used during printing.

Further, the HD includes a copy image data storage area for storing image data copied via the image forming apparatus with copy capability, and an image data management area #1 for storing management information on, for example, which portion of the copy image data storage area contains each page data to be stored on a page by page basis in the copy image data storage area. Further, the HD includes a print image data storage area corresponding to the print capability of the image forming apparatus, a FAX image data storage area corresponding to the FAX capability of the image forming apparatus, and image data management areas #2 and #3 corresponding to those image storage areas. Copy image data, print image data, and FAX image data are stored on a page by page basis during printing of corresponding images to these image data, in order to manage the corresponding files. Accordingly, detailed management information on the image data need not to be stored in the file information management area and the file information management area may only serve to store management information on, for example, which one area out of the image data management areas #1 to #3 of the HD contains the image data of interest.

In this embodiment, as previously mentioned, all the data to be stored in the HD has been encrypted and only changing the initial data on each page of a file to be stored prevents proper decoding of all subsequent data prevents proper decoding of the file. Accordingly, the file cannot be opened and the data stored in the HD can be securely and completely erased.

Figure 6:
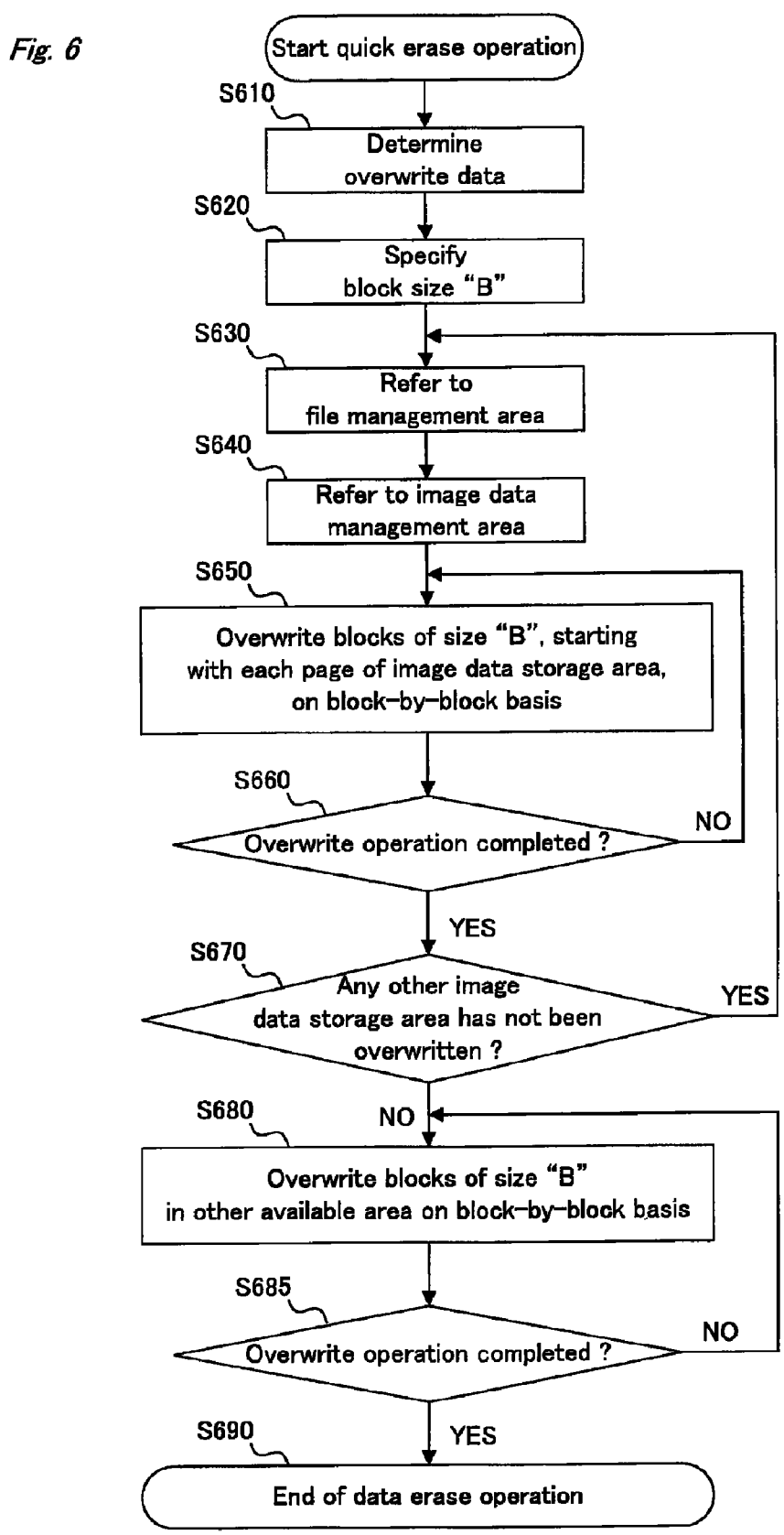
FIG. 6 is a flow chart of a data erase operation in accordance with a second embodiment of the image forming apparatus of the invention.

FIG. 6 is a flow chart of a data erase operation in accordance with the second embodiment of the image forming apparatus of the invention. In this case, FIG. 6 illustrates the case where the quick erase mode is selected and the data erase operation in the case where the quick erase mode is not selected is the same as that in the first embodiment shown in FIG. 3. Further, in the following, it is assumed that the HD includes the storage areas shown in FIG. 5.

When the quick erase mode is selected, as with the case of steps S360 and S370 in the first embodiment, step S610 specifies overwrite data so that a part of the available area on the HD is overwritten with the overwrite data and step S620 specifies equal-size blocks "B" so that a hard disk memory is divided into equal-size blocks to be overwritten with the overwrite data. The order in which the overwrite data (S610) and the equal-size blocks "B" (S620) are specified could be reversed as compared to that shown in FIG. 6.

It should be noted that selection of which portion of the equal-size block is to be overwritten is made in step S610 and at least the overwriting of the image data storage area is started from each page of the image data storage area, which is different than that of the first embodiment.

When the overwrite data (S610) and the equal-size blocks (S620) are specified, first, reference is made to the file information management area and it is determined where the image data management area is on the HD (S630). Examples of the image data management area include the image data management area #1 for storing management information related to the copy image data storage area, the image data management area #2 for storing management information related to the print image data storage area, and the image data management area #3 for storing management information related to the FAX image data storage area. Although determination of where all of the image data management areas are on the HD could be performed and then the locations of those management areas may be stored in step S630, in the following, explanation will be given to the case where determination of where the image data management area #1 is on the HD is first performed in step S630.

Reference is made to the file information management area in step S630 where it is determined where the image data management area #1 is on the HD and then reference is made to the image data management area #1 in step S640. As previously described, each image data is stored in each image data storage area on a page by page basis during printing of an image corresponding to each image data, in order to manage corresponding files. Reference is made to the image data management area #1 and an address placed at the top of each page of the copy image data stored in the copy image data storage area is identified.

Next, the overwrite data specified in step S610 is overwritten, starting from the address placed at the top of each page of the copy image data and identified in step S640, to each page of the copy image data (step S650). The overwrite operation is continued until the operation has been performed on all of the copy image data storage areas (S660).

When the overwrite operation has been performed on all of the copy image data storage areas, it is determined whether any other image data storage area has not been overwritten (S670). In this embodiment, the overwrite operation has not been performed on the print image data storage area and the FAX image data storage area. Then, the operation returns to step S630 and for example, it is determined where the image data management area #2 is on the HD. Then, as in the case with the overwrite operation related to the copy image data storage area, the overwrite data specified in step S610 is overwritten, starting from the address at the top of each page of the print image data, to each page of the print image data (step S650)

If the overwrite operation has been performed on all of the print image data storage areas, the overwrite data specified in step S610 is overwritten, starting from the address at the top of each page of the FAX image data, to each page of the FAX image data (step S650) and the overwrite operation to be performed on all of the image data storage areas ends up.

It should be noted that the explanation has been given to the case where determination of where the image data management area is on the HD is performed not on all the image data management areas and then the location(s) of the corresponding management area(s) is stored in step S630, however, in the case where determination of where the image data management area is on the HD is performed not on all the image data management areas and then the locations(s) of the corresponding management area(s) is stored in step S630, when positive determination (YES) has been made in step S670, the operation could return to step S640 rather than step S630.

If the overwrite operation has been performed on all of the image data storage areas, the overwrite operation proceeds to a subsequent overwrite operation where available areas other than the image data storage areas are overwritten (S680). Processing performed in steps S680 and S685 is similar to those performed in steps S380 and S385 in the first embodiment shown in FIG. 3, however, the overwrite operation in step S680 need not necessarily be performed on all of the available areas on the HD and may be performed on the available areas other than the image data storage areas that have already been overwritten in steps up to step S670.

When the fact that all of the available areas on the HD have been overwritten with meaningless data in steps S610 to S685 is identified, the data erase operation ends up (S690).

This embodiment also makes use of the fact that all the data to be stored in the HD has been encrypted and only changing the data on each page of a file to be stored prevents proper decoding of all subsequent data in the file. Further, the data having the highest confidentiality and chosen out of the data stored in the HD is stored in the image data storage area. In consideration of the above-mentioned facts, this embodiment is adapted such that the data having the highest confidentiality and stored in the image data storage area is overwritten, starting from the top of each page of the image data storage area, in order to more securely and quickly erase data on the HD in a short period of time, thereby making it possible to greatly reduce the amount of time required to erase data for security reasons, including prevention of leakage of confidential information.

The data erase operation in the first embodiment and the second embodiment is performed on all of, the available areas on the HD in the image forming apparatus. In contrast to those embodiments, a data erase operation in subsequently explained third and fourth embodiments of the image forming apparatus according to the invention is performed such that when a print job has been already completed in the image forming apparatus, image data unnecessary to be stored in the HD is sequentially erased.

Figure 7:
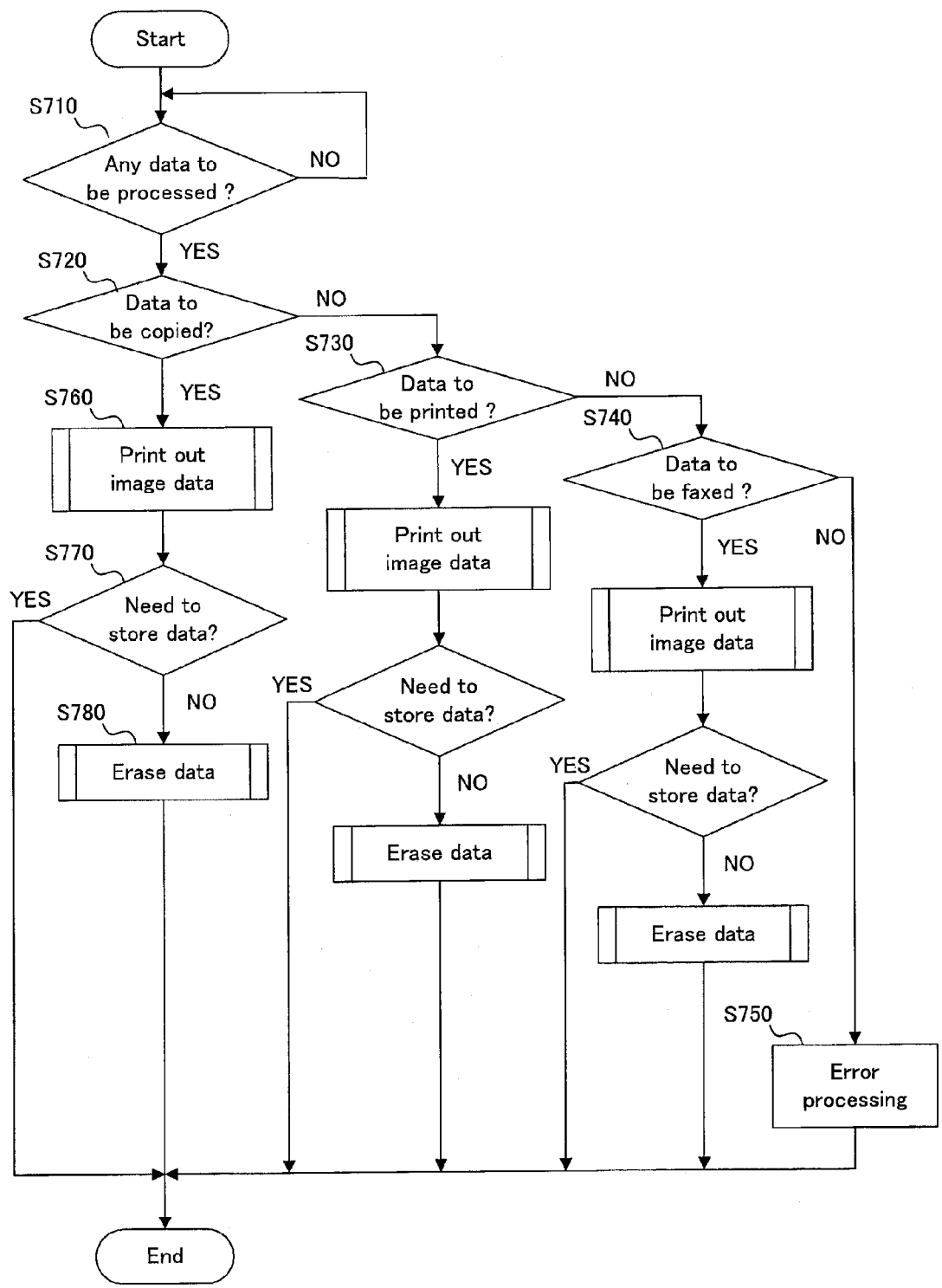
FIG. 7 is a flow chart of the outline of a data erase operation in accordance with a third embodiment of the image forming apparatus of the invention.

FIG. 7 is a flow chart of the outline of data erase operation in accordance with the third embodiment of the image forming apparatus of the invention. The print job processing device 230 continuously monitors the state of a print job in the image forming unit and controls the print job if necessary. In step S710, based on the results collected by the print job processing device 230 monitoring the state of the print job, it is monitored and determined whether any data to be printed is stored in the image forming apparatus. If data to be printed is not stored, the print job processing device continues monitoring.

If step S710 determines that data to be printed is stored, for example, step S720 determines whether any image data to be copied is stored and if the image data to be copied is not stored, step S730 determines whether any image data to be printed is stored; and if the image data to be printed is not stored, step S740 determines whether any image data to be faxed is stored. It should be noted that the order in which presence or absence of the image data is determined is not limited to the above-mentioned order. If steps S720, S730, and S740 determine that none of the image data is stored even though step S710 has determined that the print data is stored, error processing is performed in step S750 and the operation ends.

If step S720 determines that the image data to be copied is stored, the print job processing device 230 prints out the image data to be copied in step S760. When the device 230 completes printing of the image data to be copied, step S770 determines whether the image data after completion of printing needs to be stored for reuse, etc. If the image data needs to be stored, the data is not erased and the operation ends. If the image data after completion of printing need not to be stored, erasing of data related to the image data is performed in step S780. When erasing of the image data is completed in step S780, the operation ends.

If step S730 determines that the image data to be printed is stored, as in the case with the image data to be copied, processing of data related to the image data to be printed is performed. Also, if step S740 determines that the image data to be faxed is contained, as in the case with the image data to be copied, processing of data related to the image data to be faxed is performed.

Figure 8:
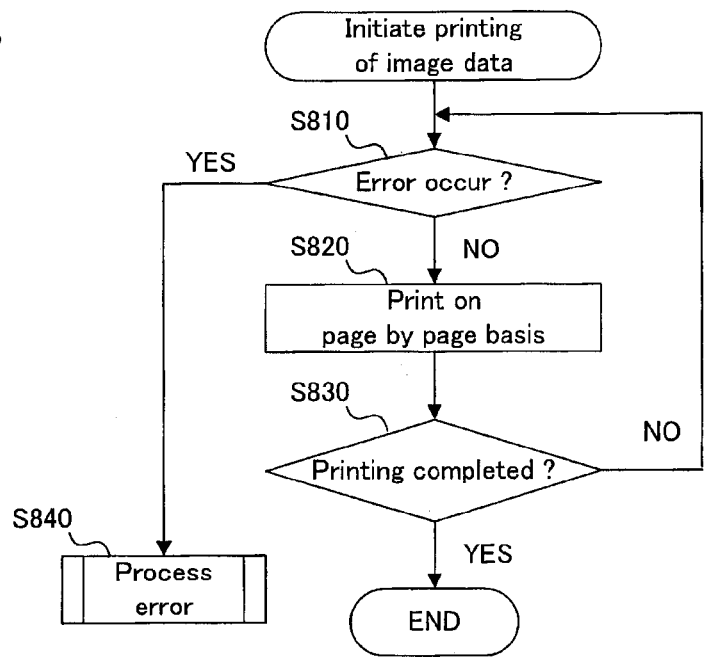
FIG. 8 is a detailed flow chart showing how printing of image data is performed in FIG. 7.

FIG. 8 is a detailed flow chart showing how printing of image data is performed in step S760 shown in FIG. 7. When the printing of image data is initiated, step S810 determines whether an error due to the printing occurs and if the error does not occur, printing is executed on a page by page basis in step S820. Then, step S830 determines whether the printing of the image data during printing is entirely completed and if the printing is not completed, the operation returns to step S810. If step S830 determines that the printing of the image data during printing has been entirely completed, the printing of the image data ends. If step S810 determines that an error due to the printing has occurred, the operation proceeds to step S840 where the error is processed.

Figure 9:
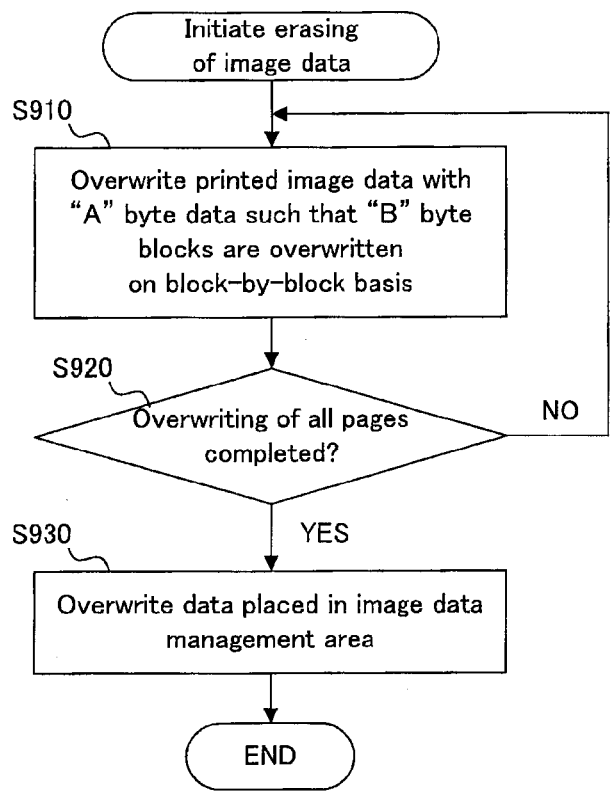
FIG. 9 is a detailed flow chart showing how the data erase operation is performed in FIG. 7.

FIG. 9 is a detailed flow chart showing how erasing of data is performed in step S780 shown T in FIG. 7. In this case, it is assumed that the overwrite data and the equal-size, blocks have been already specified for the data erase operation. Further, it is assumed that the length of the overwrite data is "A" bytes and the size of the equal-size block is "B" bytes. First, in step S910, the image data after completion of printing is overwritten such that "B" bytes of the equal-size block of the image data are overwritten with "A" bytes of the overwrite data, on a block-by-block basis. The value of "A" is, for example, 100h and the value of "B" is, for example, 1000h. It is assumed, for example that the overwrite data is 00h. Then, step S920 determines whether overwriting of all pages of the image data after completion of printing is completed. If the overwriting of all pages is not completed, the operation returns to step S910 where the overwrite operation is continued. If the overwriting of all pages is completed, management data related to the image data and placed in the image data management area that contains management information on the image data after completion of printing is overwritten in step S930. In this case, it is assumed, for example, that the overwrite data is 00h. In this way, the erasing of data related to the image data after completion of printing ends.

It should be noted that basically, the data erase operation shown in FIG. 9 is commonly applied to erase image data to be copied, image data to be printed, and image data to be faxed, and only the areas of the HD, in which data to be overwritten are stored, are different.

The present embodiment allows the erasing of the image data after completion of printing to be done in a shorter period of time. Accordingly, reduction in the amount of time required by the data erase operation causes the amount of time allocated to resources such as CPU and needed to process the printing of image data to be longer, thereby increasing the throughput of the image forming apparatus.

Next, data erase operation in accordance with a fourth embodiment of the image forming apparatus of the invention will be explained. The operation of the present embodiment is different from that of the third embodiment in the data erase step (S780) and the remaining operation of this embodiment is the same as that of the third embodiment. Accordingly, the outline of the present embodiment is shown in the flow chart of FIG. 7 and the details of the operation in the image data printing process in FIG. 7 are shown in the flow chart of FIG. 8.

Figure 10:
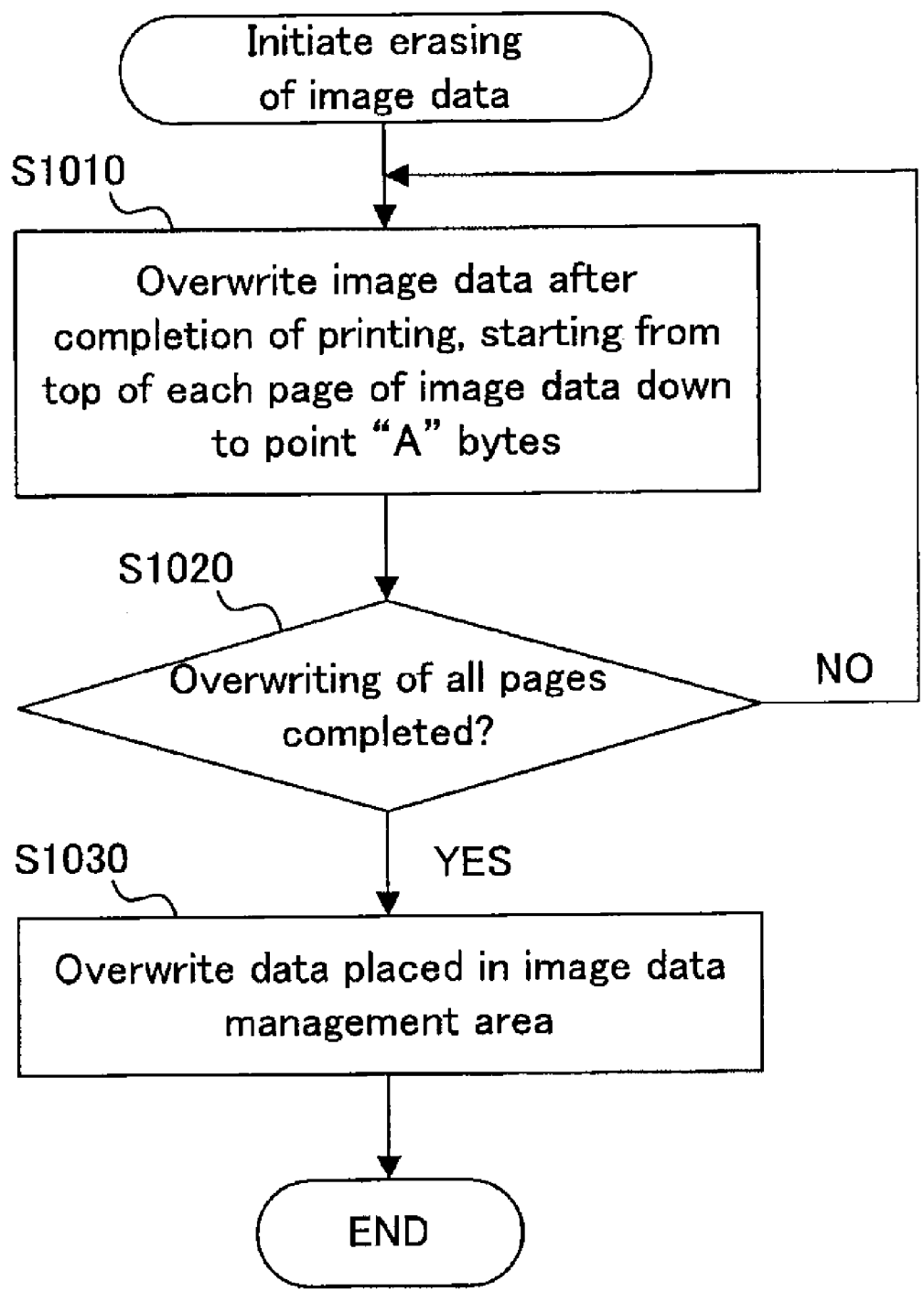
FIG. 10 is a flow chart explaining the details of how the data erase operation is performed in a fourth embodiment of the image forming apparatus according to the invention.

FIG. 10 is a flow chart explaining the details of how the data erase step (S780) shown in FIG. 7 is performed in the fourth embodiment. In this case, it is assumed that the overwrite data has been already specified for the data erase operation. Further, it is assumed that the length of the overwrite data is "A" bytes. First, in step S1010, the image data after completion of printing is overwritten, starting from the top of each page of the image data down to the point "A" bytes. The present embodiment is different from the third embodiment ins that data is overwritten starting from the top of each page. The value of "A" is, for example, 100h and the overwrite data is, for example, 00h. Then, step S1020 determines whether the overwriting of all pages of the image data after completion of printing is completed. If the overwriting of all pages is not completed, the operation returns to step S1010 where the overwrite operation is continued. If the overwriting of all pages is completed, management data related to the image data and placed in the image data management area that stores management information on the image data is overwritten in step S1030. In this case, the overwrite data is, for example, 00h. In this way, the erasing of the image data after completion of printing ends. It should be noted that basically, the data erase operation shown in FIG. 10 is commonly applied to erase image data to be copied, image data to be printed, and image data to be faxed and only the areas of the HD, in which data to be overwritten is stored, are different.

The present embodiment allows the erasing of the image data after completion of printing to be done in a shorter period of time. Accordingly, reduction in the amount of time required by the data erase operation causes the amount of time allocated to resources such as CPU and needed to process the printing of image data to be longer, thereby increasing the throughput of the image forming apparatus.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

For example, it is apparent that the present invention is also applicable to the erasing of data stored in an overwritable recording medium other than HD.

The invention claimed is:

1. An image forming apparatus comprising:
   a data storage device configured to store data relating to forming images, the data storage device including:
      an image data storage area configured to store encrypted image data on a page-by-page basis,
      an image data management data storage area configured to store management information on the image data stored in the image data storage area on a page-by-page basis, and
      an other data storage area configured to store data related to other information on image formation processes;
   an overwrite-block specifying device configured to specify equal size blocks so that a storage area in the data storage device is divided into consecutive equal size blocks to be overwritten with overwrite data;
   an overwrite-data specifying device configured to specify a value of the overwrite data whose size is smaller than that of an equal size block; and
   a data erase control device configured to overwrite the equal size blocks of the data storage device specified by the overwrite-block specifying device with the value of the overwrite data specified by the overwrite-data specifying device, on a block-by-block basis.

2. The image forming apparatus according to claim 1, wherein the data storage device is a hard disk device.

3. The image forming apparatus according to claim 1, the data erase control device overwrites a top portion of the equal size blocks of the data storage device with the value of the overwrite data.

4. The image forming apparatus according to claim 3, the data erase control device selects the top portion of each equal-size block as the portion to be overwritten and overwrites the selected top portion of the equal size blocks of the data storage device with the value of the overwrite data.

5. The image forming apparatus according to claim 3, wherein the data erase control device overwrites the top portion of the equal size blocks in the image data storage area for available image data on the data storage device with the value of the overwrite data specified by the overwrite-data specifying device.

6. The image forming apparatus according to claim 3 further comprising a quick erase mode selection device configured to select a quick erase mode or not; wherein
   the data erase control device overwrites the top portion of the equal size blocks of the data storage device with the value of the overwrite data on a block-by-block basis, in the event the quick erase mode is selected with the quick erase mode selection device; and wherein
   the data erase control device further overwrites all available area of the data storage device, in the event the quick erase mode is not selected with the quick erase mode selection device.

7. The image forming apparatus according to claim 3, wherein the overwrite-block specifying device, the overwrite-data specifying device, and the data erase control device initiate respective operation upon power-on of the image forming apparatus.

8. The image forming apparatus according to claim 3, wherein the data erase control device overwrites the top portion of the equal size blocks of the data storage device with the value of the overwrite data on a block-by-block basis, in the event completion of a document processing job on the image forming apparatus has been detected.

9. A method of erasing data in an image forming apparatus comprising:
   specifying equal-size blocks so that a storage area in a data storage device is divided into equal-size blocks to be overwritten with overwrite data; wherein the data storage device stores data relating to forming images, and includes:
      an image data storage area configured to store encrypted image data on a page-by-page basis,
      an image data management data storage area configured to store management information on the image data stored in the image data storage area on a page-by-page basis, and
      an other data storage area configured to store data related to other information on image formation processes;
   specifying a value of the overwrite data whose size is smaller than that of an equal-size block; and
   overwriting the specified equal size blocks of the data storage device with the specified value of the overwrite data, on a block-by-block basis.

10. The method of erasing data in an image forming apparatus according to claim 9, wherein the data storage device is a hard disk device.

11. The method of erasing data in an image forming apparatus according to claim 9, wherein a top portion of the equal size blocks in the image data storage area for available image data on the data storage device is overwritten with the value of the overwrite data.

12. The method of erasing data in an image forming apparatus according to claim 11 further comprising:
   selecting the top portion of each equal-size block as the portion to be overwritten; wherein
   the selected top portion of the equal size blocks of the data storage device is overwritten with the value of the overwrite data.

13. The method of erasing data in an image forming apparatus according to claim 11 further comprising:
   selecting a quick erase mode to select a quick erase mode or not; wherein
   the top portion of the equal size blocks of the data storage device is overwritten with the value of the overwrite data on a block-by-block basis, in the event the quick erase mode is selected; and wherein
   all available area of the data storage device is overwritten, in the event the quick erase mode is not selected.

14. The method of erasing data in an image forming apparatus according to claim 11, wherein operations of specifying equal-size blocks, specifying the value of the overwrite data, and overwriting the top portion of the equal size blocks in the image data storage area for available image data initiate upon power-on of the image forming apparatus.

15. The method of erasing data in an image forming apparatus according to claim 11, wherein the top portion of the equal size blocks of the data storage device is overwritten with the value of the overwrite data on a block-by-block basis, in the event completion of a document processing job on the image forming apparatus has been detected.

16. An image forming apparatus comprising:
   a data storage means configured to store data relating to forming images, the data storage means including:
      an image data storage area configured to store encrypted image data on a page-by-page basis, an image data management data storage area configured to store management information on the image data stored in the image data storage area on a page-by-page basis, and an other data storage area configured to store data related to other information on image formation processes;

an overwrite-block specifying means configured to specify equal size blocks so that a storage area in the data storage means is divided into consecutive equal size blocks to be overwritten with overwrite data;

an overwrite-data specifying means configured to specify a value of the overwrite data whose size is smaller than that of an equal size block; and a data erase control means configured to overwrite the equal size blocks of the data storage means specified by the overwrite-block specifying means with the value of the overwrite data specified by the overwrite-data specifying means, on a block-by-block basis.

17. The image forming apparatus according to claim 16, the data erase control means overwrites a top portion of the equal size blocks of the data storage means with the value of the overwrite data.

18. The image forming apparatus according to claim 17, the data erase control means selects the top portion of each equal-size block as the portion to be overwritten and overwrites the selected top portion of the equal size blocks of the data storage means with the value of the overwrite data.

19. The image forming apparatus according to claim 17, wherein the data erase control means overwrites the top portion of the equal size blocks in the image data storage area for available image data on the data storage means with the value of the overwrite data specified by the overwrite-data specifying means.

* * * * *